Feb. 7, 1967     T. MÜLLER     3,302,802
DEVICE FOR REMOVING SELF-RESILIENT RINGS FROM MACHINE TOOLS
Filed Oct. 23, 1964
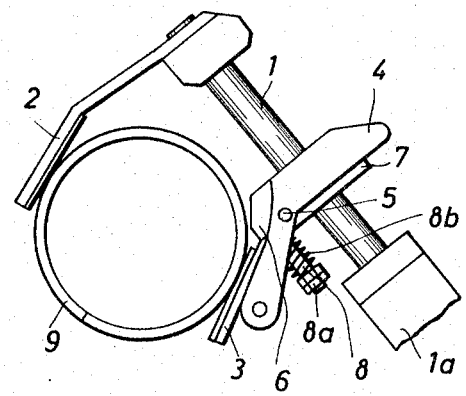
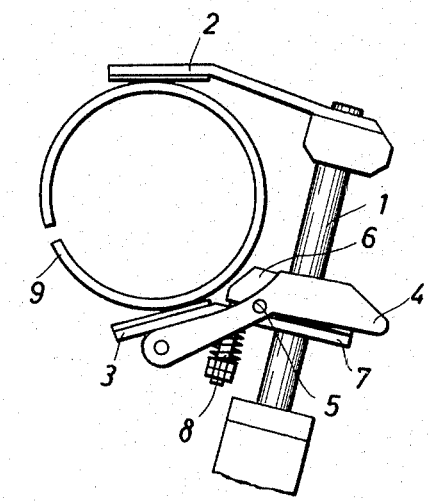
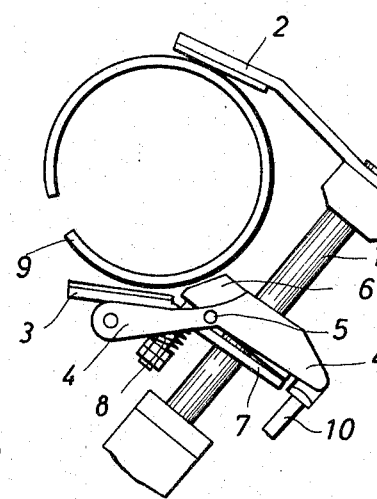
Inventor
Theo MÜLLER
By 3,302,802
DEVICE FOR REMOVING SELF-RESILIENT RINGS
FROM MACHINE TOOLS
Theo Müller, Pattscheid, Germany, assignor to Goetzewerke Friedrich Goetze Aktiengesellschaft, Dusseldorf, Germany
Filed Oct. 23, 1964, Ser. No. 405,908
Claims priority, application Germany, Dec. 16, 1963, G 39,397
6 Claims. (Cl. 214—1)

The present invention relates to a device for removing self-resilient rings, especially piston rings, from machine tools.

When machining the outer surface of split piston rings in a machine tool, the rings are compressed to close the gap therein and are then held in the machine tool on a mandrel or the like by exerting a clamping force on the rings in the axial direction. The rings are usually placed in the machine tool in packets of two or more rings.

After the machining of the outer circumference of piston rings, the piston rings are removed from the machine tool. With heretofore known methods, the piston rings dropped out of the machine through the frame of the machine to a receiving station. Piston rings discharged in this way, however, are difficult to receive on a receiving spike or pin with any degree of regularity. The only practical way to receive such dropping piston rings was in a box from which they had subsequently to be collected manually and only with considerable difficulty inasmuch as the piston rings become entangled in view of the gaps therein.

It is, therefore, an object of the present invention to provide a device for removing self-resilient rings, especially piston rings, from machine tools, which will overcome the above-mentioned drawbacks.

It is a further object of the present invention to provide a device as set forth in the preceding paragraph which will make it possible to place self-resilient rings on a receiving spike or pin easily and automatically.

It is a still further object of the present invention to provide a device as set forth in the preceding paragraphs in which the self-resiliency of the piston rings is utilized for assisting in the removing of the rings from the machine.

These and other objects and advantages of the invention will appear more clearly from the following specification taken in connection with the accompanying drawings, in which:

FIGURE 1 is a side view of a two-jaw plier device for handling piston rings according to the present invention shown in ring receiving position;

FIGURE 2 shows the plier device of FIG. 1 in ring holding or supporting position; and FIGURE 3 shows the plier device of FIG. 1 in ring releasing or discharging position.

The present invention is based on the finding that the difficulties encountered with heretofore known methods and devices for discharging split rings from machine tools may be prevented by use of a plier like device adapted to engage one or more rings to be removed from a machine tool. Such plier like devices are adapted to remove the rings from the machine tool while maintaining control of the rings by utilizing the self-resiliency or internal tension of the rings to be removed.

The removing device according to the present invention is characterized primarily in that it comprises two jaws operating in the manner of pliers for gripping the rings and adapted to be displaced with regard to each other by the spring force of the resilient ring or rings being gripped thereby. The rings, especially piston rings clamped by axial pressure in the lathe or other machine tool, open up to a certain extent upon release of the axial clamping force and expand between the two jaws so as to become clamped thereby while causing the jaws to move away from each other. The rings, thus, are not spread beyond their free diameter. The plier-like removing device is subsequently moved, together with the ring or rings therein from the receiving position into a discharging position and wherein the rings can be brought into the proper relation to a receiving spike or pin to be received thereon without difficulty.

Piston ring plier like devices for placing piston rings on pistons are known. For this purpose, the known device will spread the ring to such a diameter that it can be passed over the piston and then snapped into the respective groove after the device releases the ring. It is, however, to be kept in mind that for removing piston rings from machine tools, it is required that the rings do not assume a larger diameter than their free diameter in untensioned condition.

Referring now to the drawing in detail, the device shown for removing piston rings from machine tools comprises a bar-like holder 1 having fixedly connected thereto a first jaw 2. A further second jaw 3 is mounted, as by a pivotal connection, on the end of one arm of an angle lever 4 which is pivotally mounted by a pivot pin or bolt 5 on a slide member 6 displaceable in longitudinal direction along holder 1 and is held on holder 1 in adjusted positions thereon.

Jaw 3 is normally urged against member 6 by spring 8 so that portion 7 of the jaw 3 is flat against member 6, thus forming a stop for jaw 3 in one direction of movement thereof. The force of spring 8 is adjustable by means of nut means 8a threaded on the end of rod 8b which is attached to member 6 and extends through jaw 3 and spring 8.

As will be evident from the drawing, spring 8 prevents the mouth of the device formed by jaws 2 and 3 from being opened beyond a certain amount when under the pressure of a piston ring or rings clamped therein. The jaws spread apart, when a ring is disposed therein, to such an extent that the radial tension of the ring and the pressure of the spring 8 balance each other.

The spacing between the jaws 2 and 3 is so adjusted that the jaws are adapted to embrace the piston ring 9 with slight play when the ring gap is closed, as will be the case when the ring is clamped in a machine tool. When the ring 9 is released, as by unclamping thereof, it expands the engages the jaws 2 and 3 and thereby tilts the jaw 3 to thereby cause lever 4 to tilt about pivot 5 against the pressure of the spring 8 until the resilient forces balance each other. In this instance, the end of portion 7 is supported by the slide member 6, as is also the case when the jaws of the holding device are in the position shown in FIG. 3. With the jaws in the position shown in FIG. 2, the piston ring 9 is supported by the device and can be transported in the device to a discharging station.

For purposes of releasing the rings from the device, according to a further feature of the present invention, a lever or cam is provided which engages lever 4 and moves lever 4 and thereby jaw 3 so as to open the jaws against the pressure of the spring 8 at the discharging station and thereby release the clamped ring from the device.

Advantageously, the holder 1 of the jaws 2 and 3, or all holders in case there are a plurality of holders is/are tiltable for purposes of bringing the piston rings held in the jaws into a horizontal or nearly horizontal position when they are conveyed from vertically clamped positions in the machine tool. In this horizontal position, the piston rings can readily be dropped on a receiving mandrel or spike. In case the piston ring is horizontally clamped in the machine tool, it is to be understood that it is not necessary to provide for the tilting of the device at the discharge station.

When the device is located above the receiving spike of the discharging station, it may be turned, if necessary, in the direction of the arrow A (see FIG. 3). In this position, a rod or cam 10 moves the lever 4 against the pressure of the spring 8 about the pivot 5 into a position in which the jaw 3 is opened sufficient to release the ring 9. Holder 1, to permit tilting thereof, may be rotatable in a support member 1a.

As will be evident from the above, the device according to the present invention affords a fast, automatic and reliable means for removing self-resilient rings from machine tools in a very simple manner while delivering the rings in such a manner as to prevent damage thereto and so as to facilitate further handling.

It will be understood that single rings or groups or packets of rings could be handled by the device according to the present invention merely by selecting the jaw sizes and spring 8 so as to fit the particular condition. Rings of different diameters can be accommodated by adjusting member 6 along holder 1 to the proper place and retaining it in the adjusted position.

It is, of course, to be understood that the present invention is, by no means, limited to the particular construction shown in the drawing, but also comprises any modifications within the scope of the appended claims.

What is claimed is:

1. A device for removing a self-resilient split piston ring from machine tools and the like wherein the ring iso clamped with the gap closed comprising; a holder, a pair of jaws mounted in adjustable spaced relation on the holder and forming a mouth therebetween adapted to receive a clamped piston ring with not more than a slight clearance of the jaws from the ring whereby expansion of the ring upon unclamping thereof will cause the ring to engage the jaws, spring means resiliently urging the jaws toward each other with a thrust such that the jaws will move apart under the force of the ring when the ring expands upon being unclamped, one of said jaws being pivotally supported on said holder, and actuating means for moving said one jaw about its pivotal connection with said holder to release a ring held between said jaws.

2. A device for removing a self-resilient split piston ring from machine tools and the like wherein the ring is clamped with the gap closed comprising; a holder, a pair of spaced jaws in adjustable spaced relation on the holder and forming a mouth therebetween adapted to receive a clamped piston ring with not more than a slight clearance whereby expansion of the ring upon unclamping thereof will cause the ring to engage the jaws, spring means resiliently urging the jaws toward each other with a thrust such that the jaws will move apart under the force of the ring when the ring expands, actuating means for moving said jaws away from each other to release a ring held therein, and means on the holder limiting the movement of said jaws toward each other.

3. A device for removing a self-resilient split piston ring from machine tools and the like wherein the ring is clamped with the gap closed comprising; a holder, a pair of spaced jaws in adjustable spaced relation on the holder and forming a mouth therebetween adapted to receive a clamped piston ring with not more than a slight clearance whereby expansion of the ring upon unclamping thereof will cause the ring to engage the jaws, spring means resiliently urging the jaws toward each other whereby the jaws will move apart under the force of the ring when the ring expands, actuating means for moving said jaws away from each other to release a ring held therein, means on the holder limiting the movement of said jaws toward each other and means for tilting said holder to present a ring in said jaws in a substantially horizontal position for release from the jaws whereby the ring can be dropped on a receiving spike or the like.

4. A device for removing a self-resilient split piston ring from machine tools and the like wherein the ring is clamped with the gap closed comprising; a bar-like holder, a first jaw fixed to said holder, a member adjustable along said holder toward and away from said first jaw, a lever pivoted at an intermediate point thereof to said member, a second jaw on one arm of the lever spaced from the first jaw to define a ring receiving mouth, spring means acting on said second jaw urging it toward said first jaw, and means for stopping said second jaw in a predetermined position of movement toward said first jaw while permitting movement of said second jaw away from said first jaw under the force of a ring expanding between the jaws.

5. A device for removing a self-resilient split piston ring from machine tools and the like wherein the ring is clamped with the gap closed comprising; a bar-like holder, a first jaw fixed to said holder, a member adjustable along said holder toward and away from said first jaw, a lever pivoted at an intermediate point thereof to said member, a second jaw on one arm of the lever spaced from the first jaw to define a ring receiving mouth, spring means acting on said second jaw urging it toward said first jaw, and means for stopping said second jaw in a predetermined position of movement toward said first jaw while permitting movement of said second jaw away from said first jaw under the force of a ring expanding between the jaws, and means for tilting said lever about its pivotal connection with said member to move said second jaw away from said first jaw thereby to spread said jaws apart and release a ring held therein.

6. A device according to claim 5 in which support means is provided rotatably supporting said holder to permit tilting of said jaws to receive a ring in a vertically clamped position and release it in a substantially horizontal position.

References Cited by the Examiner

UNITED STATES PATENTS

| 1,626,410 | 4/1927 | Halstead | 214—147 |
| 1,953,926 | 4/1934 | Cammen | 294—104 X |
| 2,420,714 | 5/1947 | Mead | 81—103 |
| 2,580,472 | 1/1952 | Smith | 214—147 |

FOREIGN PATENTS 20,287    1912    Great Britain.

MARVIN A. CHAMPION, *Primary Examiner.*